United States Patent [19]

Guerra et al.

[11] Patent Number: 4,581,252

[45] Date of Patent: Apr. 8, 1986

[54] PROCESS FOR PROVIDING OPTICAL PRODUCTS MADE OF GLASSY POLYMERS WITH A VARIABLE REFRACTIVE INDEX

[75] Inventors: Gaetano Guerra; Umberto Mandara; Antonio Moschetti, all of Naples, Italy

[73] Assignee: Montedison S.p.A., Milan, Italy

[21] Appl. No.: 765,439

[22] Filed: Aug. 14, 1985

Related U.S. Application Data

[63] Continuation of Ser. No. 545,497, Oct. 26, 1983, abandoned.

[30] Foreign Application Priority Data

Oct. 27, 1982 [IT] Italy ............................... 23947 A/82

[51] Int. Cl.$^4$ ............................................. B05D 5/06
[52] U.S. Cl. .................................... 427/162; 427/163; 427/164; 427/372.2; 427/385.5; 427/387; 427/393.5; 427/430.1

[58] Field of Search ............ 427/162, 163, 164, 372.2, 427/385.5, 387, 393.5, 430.1, 444

[56] References Cited

U.S. PATENT DOCUMENTS

| | | | |
|---|---|---|---|
| 3,582,398 | 6/1971 | Ringler | 427/164 |
| 3,745,042 | 7/1973 | Lim et al. | 427/164 |
| 3,865,619 | 2/1975 | Pennewiss et al. | 427/164 |
| 3,999,834 | 12/1976 | Ohtomo et al. | 427/164 |
| 4,046,457 | 9/1977 | Land et al. | 427/164 |
| 4,049,846 | 9/1977 | Hovey | 427/164 |

Primary Examiner—S. L. Childs

[57] ABSTRACT

Light guide articles made of glassy polymers are provided with a gradually varying refractive index by immersion in a solution of a substance having a different refractive index and which swells the glassy polymer under the immersion conditions and thereafter heating the article under conditions to remove the solvent and leave the substance of different refractive index under the surface of the article.

7 Claims, 3 Drawing Figures

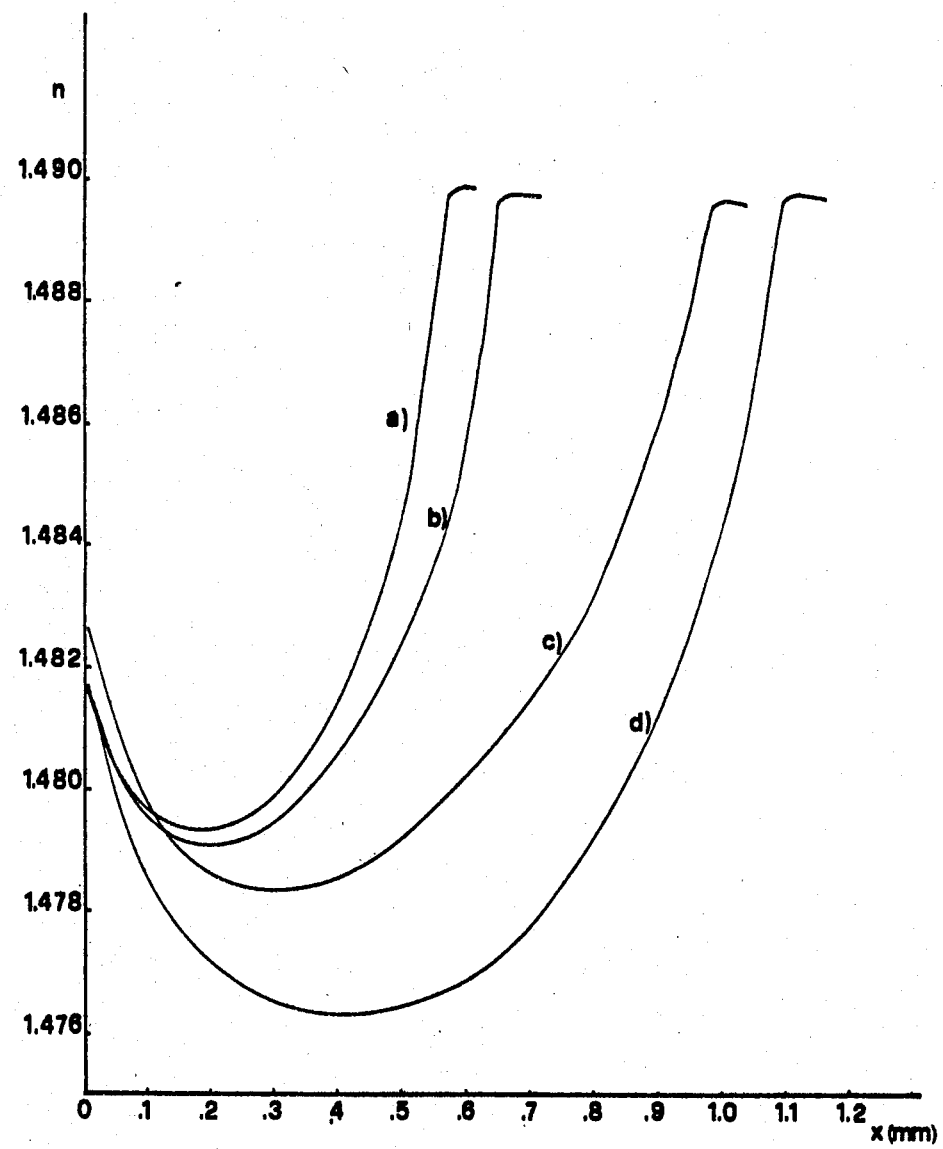
Fig. I

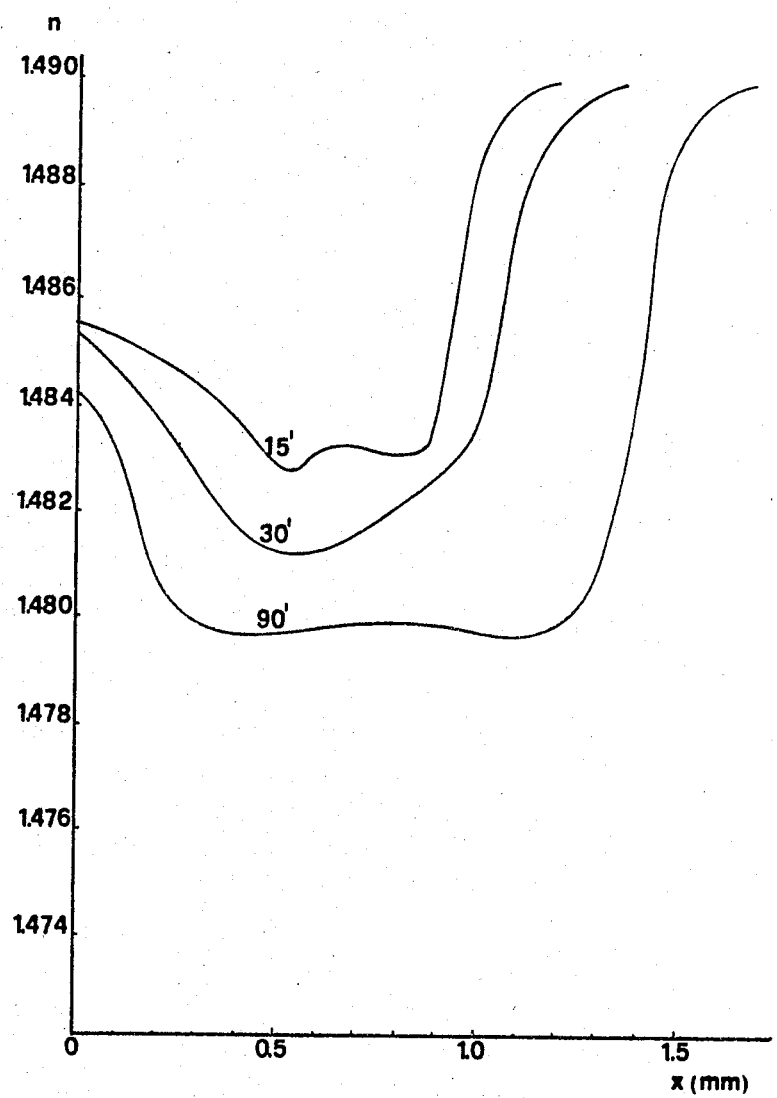
Fig. II

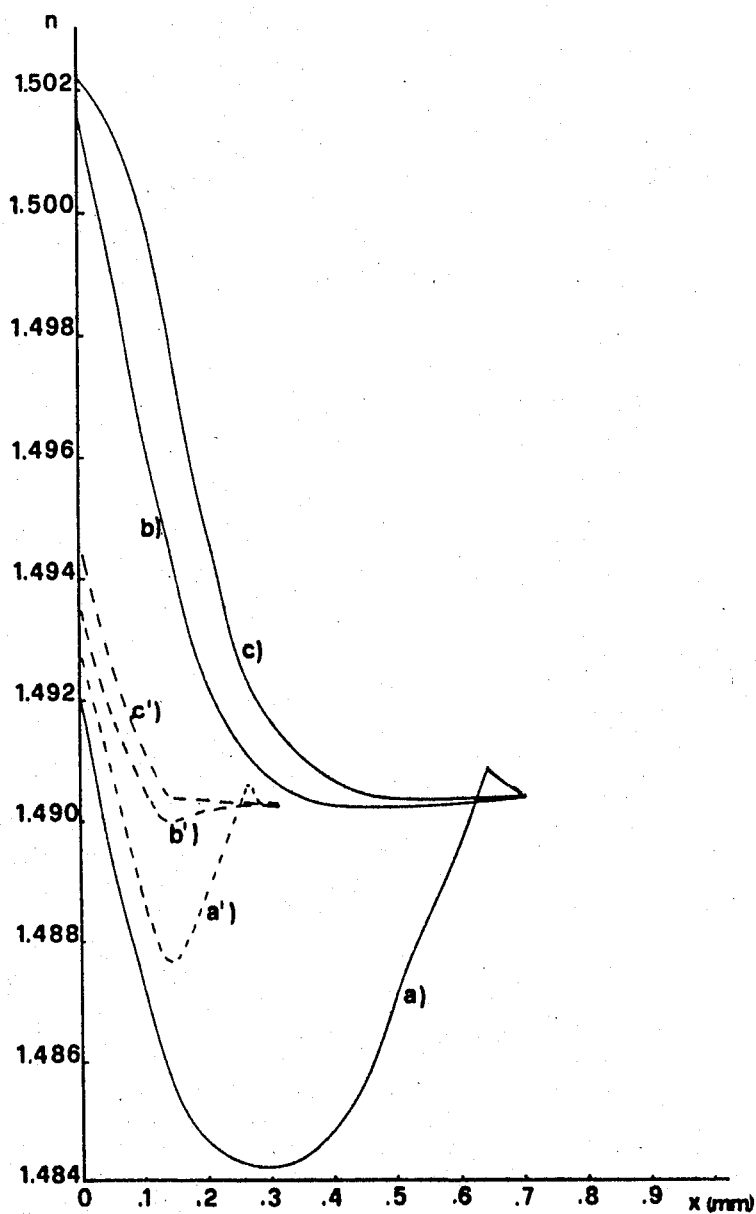
Fig.III

PROCESS FOR PROVIDING OPTICAL PRODUCTS MADE OF GLASSY POLYMERS WITH A VARIABLE REFRACTIVE INDEX

This is a continuation, of application No. 545,497 filed Oct. 26, 1983 now abandoned.

BACKGROUND OF THE INVENTION

This invention relates to a process for manufacturing light guide articles.

More particularly, the present invention relates to a process for manufacturing light guide articles consisting of glassy polymers in which the refractive index is caused to gradually vary.

The term "glassy polymers", whenever used in the present specification and in the appended claims, means the amorphous polymers, whose glass transition temperature is higher than the room temperature, such as e.g. the polymers and copolymers belonging to the series of polymethacrylates and of polyacrylates, polystyrene, vinyl polyacetate, polycarbonate, etc.

The term "light guide articles", whenever used in the present specification and in the appended claims, means optical components such as e.g. lenses, radiation concentrators, optical fibers, etc.

DESCRIPTION OF THE PRIOR ART

Many processes for manufacturing light guide articles are known, such as e.g. that of diffusing a suitable monomer in a polymer or in a prepolymer, successively prepolymerizing the monomer and, optionally, completing the prepolymer polymerization by means of a proper reaction, generally a photochemical reaction.

This process, although it allows in a few cases to obtain satisfactory results, is rather complicated and expensive.

Another known process for preparing light guide articles consists in coaxially co-extruding two polymers having different indexes of refraction.

This process however permits to obtain only optical components having a sharp and discontinuous variation in the refractive index.

SUMMARY OF THE INVENTION

The object of the present invention is to provide a new process for manufacturing light guide articles which does not exhibit the above-mentioned drawbacks.

More in particular, the object of the present invention is to provide a new process for manufacturing light guide articles which is easy and economic to carry out and permits to obtain optical products with a continuous, gradual, controllable and stable variation of the refractive index.

According to the present invention these and still other objects are achieved by a process which consists in immersing the article prepared from a glassy polymer into a bath containing a substance having a refractive index different from that of the polymer of the article by at least $5.10^{-2}$ units, dissolved in a solvent thereof having a low boiling point and capable of swelling the polymer, and in treating the additioned manufactured article so obtained at a temperature ranging from 20° to 150° C. in order to remove the solvent.

The substance having a different refractive index which is employed in the process forming the object of this invention, besides having a refractive index other than the one of the polymer, must preferably exhibit a low volatility, generally a boiling temperature higher than 80° C., a good compatibility with the polymer of the article and be stable to light radiations.

Among the various substances meeting these requirements, we may cite the fluorinated alcohols, the inorganic acids and hydroxides, the fluorinated acids, the fluorinated amines, the fluorinated acrylates, the esters, the anhydrides, the inorganic halides and nitrates, the halogenated alkanes, the aromatic hydrocarbons and the alkoxy-silanes.

Specific examples of these substances are: beryllium fluoride, boron and caesium tetrafluoride, 1,3-difluoro-2-propanol, perfluoro-octanol, difluoroacetic acid, heptafluorobutyrric acid, heptacosfluorotributylamine, pentafluoropropylacrylate, dimethyl ester of sulphoric acid, acetic anhydride, lithium iodide, potassium iodide, zinc chloride, lead nitrate, bromoform, diiodomethane, styrene, benzaldehyde, ortho-phosphoric acid, boric acid, sodium hydroxide, tetra-methoxy-silane, tetra-ethoxy-silane etc.

The concentration of the substance having a different refractive index varies as a function of the type of substance and of the glassy-polymer constituting the article. Generally, it is preferable to employ very concentrated solutions provided that the resulting article retains its transparency unaltered. Solutions containing up to 100% by weight of substance, having a different refractive index, may be used.

As solvents for the substance having a different refractive index it is possible to use alcohols, esters, ketones, glycols, gasoline, etc. In practice the preferred solvents are those having a low molecular weight, such as methyl alcohol, ethyl alcohol, n.butyl alcohol, hexane, benzene, acetone, ethylene glycol, etc., depending on the polymer which the articles are made of. Mixtures of these solvents with water may be also used, especially when the article contains frozen stresses generated in the molding process.

The immersion time of the article in the solution may vary from 1 minute to 200 minutes, depending on the bath temperature, which generally ranges from room temperature to 100° C., on the type of solvent utilized and on the type of article.

To favor the additioning process and to obtain a more homogeneous refractive index profile on the entire article surface it is advisable to stir the bath or to utilize a forced circulation bath. The bath temperature and concentration are generally maintained constant during the whole additioning process.

Furthermore, it is preferable to subject the article, prior to additioning, to a preliminary washing and degreasing treatment.

The additioned article leaving the bath is then repeatedly washed with water or with a solvent or with a mixture thereof, and subjected to a heat treatment between 20° and 150° C. to remove the solvent.

During this heat treatment, the solvent migrates outwards the article and evaporates, while leaving the additive in the surface layer of the polymer for a depth comprised between 20 and 300 μm.

According to the process of the present invention the depth and the concentration of the additive and therefore the refractive index profile may be controlled by acting on the concentration of the additive in the bath, on the bath temperature and on the immersion time.

Furthermore, the process according to the present invention makes it possible to use non-thermostable additives, as the process temperature does not exceed 150° C.

The light guide articles, obtained by the process of the present invention, show a high hardness, not dissimilar from the one of the non-treated starting glassy polymer. For its high superficial hardness, the light guide articles of the present invention may be directly used, without the use of protection jackets.

In the case of optical fibers, wherein, as known, a lateral screening may be requested in order to protect them from the light radiations, this screening or shielding may be obtained either by spreading or by immersing again the fibres into a bath containing a black dyestuff dissolved in a solvent thereof having a low boiling point and capable of swelling the polymer and then removing the solvent by a heattreatment.

The thickness of the screening is generally comprised between 0.001 and 20 μm.

Many variations and changes may be made in the details of the present invention, but without departing from the spirit or scope thereof.

The following examples are given still better to illustrate this invention without being however a limitation thereof.

In the examples, all parts are parts by weight, unless otherwise specified.

EXAMPLE 1

A polymethylmethacrylate fiber of 4 mm. diameter, having a refractive index of 1.49, was immersed into a bath consisting of a methanol solution at 25% by weight of 1,3-di-fluoro-2-propanol, maintained at a temperature of 60° C.

At regular intervals of time of 15, 30, 60 and 90 minutes, fiber samples a, b, c, and d, respectively, were drawn from the bath and were then washed with water and dried in oven at 70° C. for two days. Interferometric measurements according to the Mac Zender method were carried out on each sample, thus obtaining the refractive index profiles shown in FIG. I of the accompanying drawing. This figure shows the trend of the refractive index (n) versus the fiber radial distance measured in mm. starting from the outside.

EXAMPLE 2

Polymethylmethacrylate sheets having a 4 mm. thickness were immersed into a bath consisting of a methanol solution at 25% by weight of difluoro-acetic acid, kept at a temperature of 60° C.

At intervals of 15', 30' and 90' minutes, the sheets were taken out from the bath and were washed with water and dried in oven at 70° C. for 2 hours. FIG. II of the drawing shows the trends of the index of refraction (n) versus the distance (x mm.) from the sheet surface.

EXAMPLE 3

2 mm thick polymethylmethacrylate sheets were immersed into a bath consisting of a methanol solution at 20% by weight of zinc chloride, maintained at a temperature of 60° C. A sheet was drawn from the bath after 15 minutes, another sheet after 60 minutes. These sheets were washed with methanol and successively with water. FIG. III of the drawing shows the trends of the refractive index (n) versus the distance ($\times$mm.) from the sheets' surfaces. The dashed lines relate to 15-minutes immersion time, while the solid lines to 60-minutes immersion time. The curves indicated with (a) and (a') correspond to a two-day drying at room temperature; curves (b) and (b') correspond to a 2-day drying at 70° C., and curves (c) and (c') to a two-hour drying at 130° C.

EXAMPLE 4

A polymethylmethacrylate fiber of 2 mm. diameter, having a refractive index of 1.49, was immersed into a bath consisting of a methanol solution at 95% by weight of tetraethoxy-silane (having a refractive index of 1.38) maintained at a temperature of 90° C. After 20 minutes, the fiber was drawn from the bath and was washed with water and dried at room temperature.

The obtained fiber showed a penetration depth of the additive of 35 μm, a numerical aperture of 0.45, measured by the far field scanning in white light; a spectral attenuation, measured by the insertion method, of 2 d B/m at 500 μm; and a hardness, measured by the pencil hardness, of 6 H.

What is claimed is:

1. A process for providing optical articles prepared from a glassy polymer having a glass transition temperature higher than the room temperature with a gradually varying refractive index, which process consists of the following steps: (1) immersing said article in a solution of a substance having a refractive index different from the refractive index of the glassy polymer by at least $5.10^{-2}$ units, in a solvent of said substance having a low boiling point and which swells the glassy polymer under the immersion conditions, and (2) heating the article so obtained at a temperature of 20° C. to 150° C. to remove the solvent and leave the substance having the different refractive index in the surface layer of the optical article to a depth of at least 20 microns.

2. The process according to claim 1, in which the substance having a different refractive index has a low volatility, a boiling temperature higher than 80° C., a good compatability with the polymer of the optical article and a stability to light radiations.

3. The process according to claim 2, in which the substance having a different refractive index is selected from the group consisting of fluorinated alcohols, fluorinated acids, fluorinated amines, fluorinated acrylates, esters, anhydrides, inorganic acids and hydroxides, inorganic halides, inorganic nitrates, halogenated alkanes, aromatic hydrocarbons and alkoxy-silanes.

4. The process according to claim 1, in which the substance having a refractive index different from that of the glassy polymer is present in the immersion solution in a concentration up to 100% by weight.

5. The process according to claim 1, in which the solvent having a low boiling point is selected from the group consisting of the alcohols, esters, ketones, glycols and gasoline, having low molecular weight.

6. The process according to claim 5, in which the low boiling point solvent is used in admixture with water.

7. The process according to claim 1, in which the bath temperature ranges from the room temperature to 100° C. and the immersion time varies from 1 minute to 200 minutes.

* * * * *